Patented Sept. 29, 1936

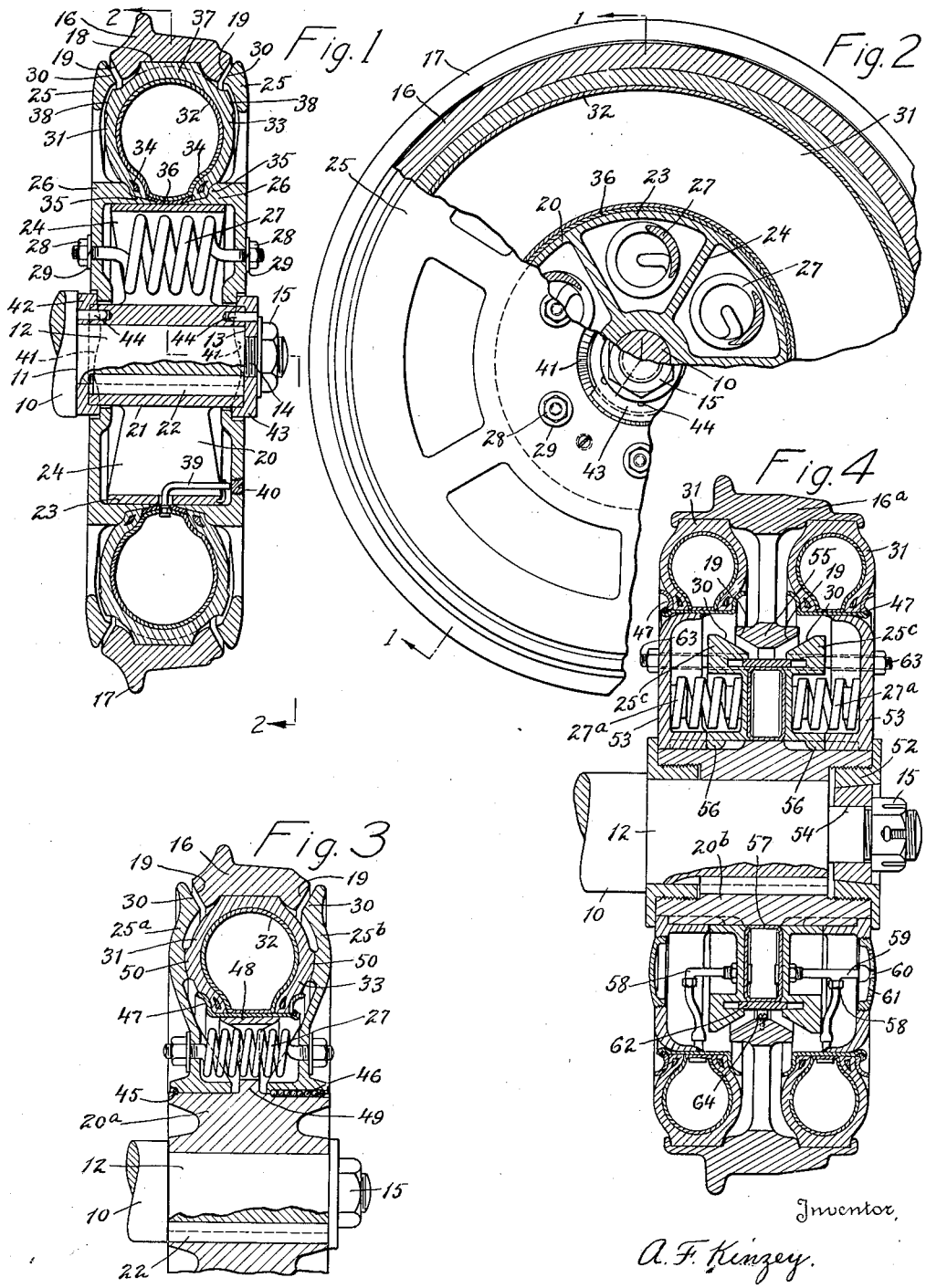

2,055,823

UNITED STATES PATENT OFFICE 2,055,823

CUSHION WHEEL

Albert F. Kinzey, Cuyahoga Falls, Ohio

Application February 28, 1935, Serial No. 8,671

20 Claims. (Cl. 295—12)

This invention, relating to pneumatic cushion wheels, has for its principal purposes to provide a wheel of this class adapted for railway vehicles, having means responsive to the inflation pressure for automatically changing the wheel from a cushioned to a substantially rigid structure in case of deflation of the pneumatic cushioning means, one having means for supporting the wheel body concentrically on the outer tire in case of such deflation, and one having improved means for cushioning and limiting the normal lateral relative movments of said body and tire. Further objects are to provide a cushion-wheel structure capable of easy and secure assembly and adapted for manufacture at a moderate cost, to reduce the liability to deflation, increase the durability and lower the maintenance cost of such wheels.

This application is a continuation in part of my prior application Serial No. 698,351, filed Nov. 16, 1933.

Of the accompanying drawing, Fig. 1 is an axial section through a portion of a wheel and axle, approximately on the irregular line 1—1 of Fig. 2, showing a preferred embodiment of my invention.

Fig. 2 is a transverse partial section approximately on the irregular line 2—2 of Fig. 1.

Fig. 3 is a partial axial section showing a modification.

Fig. 4 is an axial section showing a second modification which was the principal embodiment disclosed in my said prior application, Ser. No. 698,351.

In the drawing, 10 is a rotary or live axle adapted to transmit driving power to the wheel and/or to arrest the latter's rotation through a suitable brake on said axle. The axle has an inner wheel-retaining shoulder 11, an adjacent reduced cylindrical wheel-receiving portion 12, a shoulder 13 at the outer end of the latter, and a threaded outer end portion 14 on which is a wheel-retaining nut 15.

16 is an outer metallic tire formed with a rail-guide flange 17 and with an inner cushion seat 18 constituted by a wide and shallow groove, the middle of which is flat or cylindrical and its sides flaring. The outer side faces of the tire are formed as female-cone emergency supporting surfaces 19.

The inner wheel body includes a member 20 having a hub 21 fitted on the reduced portion 12 of the axle and fixed against rotation thereon by a key 22, a cylindrical rim 23 and a series of connecting spokes 24 of a suitable number such as six. The wheel body further includes a pair of emergency supporting side plates or rings 25 formed with intermediate annular flanges 26 whose inner peripheries are fitted to slide axially on the rim of the body member 20, said plates being yieldingly drawn together by a series of helical pull-springs 27 occupying the apertures between the spokes 24. These springs have threaded ends projecting through apertures in the plates 26 and their pressure is transmitted to the plates through nuts 28 and lock washers 29. The rim portions of the plates 25 are inwardly formed with male-cone surfaces 30 complemental to the surfaces 19 on the sides of the rail tire 16 and adapted to contact therewith under certain conditions.

Between the rail tire and the inner wheel body is interposed an annular pneumatic cushion 31 having the construction of an ordinary pneumatic tire, namely a rubber inner tube 32 and an outer casing 33 of the usual rubberized inextensible fabric carcass construction (not fully shown in detail) and surface rubber, said casing having the usual edge beads 34. Said beads are fitted in bead seats 35 of complemental shape formed on the outer sides of the plate flanges 26 and in this case are spreadable so that, when the cushion is properly inflated, the plates 25 are held apart by the expansion of the tire at the beads. The tube 34 seats upon an annular flexible flap 36 whose margins overlie the thin tapered inner marginal portions of the flanges 26 to avoid pinching of the tube when said flanges come together. The tread portion 37 of the cushion casing abuts the seat 18 on the rail tire 16. At the shoulders of the casing 33 are formed annular contact ribs 38 of rubber normally spaced slightly from complemental inner surfaces of the emergency rings 25 but adapted to contact therewith by a lateral thrust in either direction to cushion the relative lateral movements of the wheel body and tire 16, said movements being finally positively limited by contact of the surfaces 19 and 30.

Inflation of the tube 32 is effected through an angular valved stem or pipe 39 whose mouth is opposite an opening in the outer side plate 25 closed by a removable screw plug 40.

The inner marginal portions of the emergency plates or rings 25 are externally formed with undulating cam-like or wedge members 41 interfitted with complemental members formed upon a pair of rings 42, 43 which surround the reduced portions of the axle 10 and are held against turning with respect to the wheel hub 21 by dowels 44, the outer ring 43 being held against the axle shoulder 13 by the nut 15. These cam or wedge rings form a driving connection between the axle and the wheel body rings 25, and their angular displacement with respect to the rings 25 through torque reactions caused by braking or driving when the cushion 31 is deflated produces a locking of the rings 25 when the latter are supported by their conical surfaces on those of the tire 16, which tends to avoid relative radial displacement or chatter between the tire and wheel body when the two are thus connected in rigid relation.

In the operation of this form of my invention, the inflation of the pneumatic tire or cushion 31 to service pressure spreads the rings 25, through the action of the casing beads 34 thereon, against the tension of the springs 27 to hold said rings against the stops formed by the cam rings 42, 43, and the wheel body is thereby yieldingly supported on the rail tire 16 and radially cushioned thereby through a small amplitude of movement through the ability of the inflated cushion to flex substantially throughout its entire depth. The wheel body and tire are also cushioned as to relative lateral movement by the lateral flexibility of the pneumatic cushion and the abutting of its ribs 38 against the rings 25, the extremes of such relative lateral movement being positively limited by the abutting of the conical surfaces 19 and 30. In case of failure of the pneumatic pressure through deflation of the cushion to a point where the lateral pressure of the beads 34 is no longer able to overcome the opposing pressure of the springs 27, said springs draw the plates or rings 25 inwardly until the emergency conical surfaces 19 and 30 are brought together and the wheel body is then concentrically supported on the rail tire and the two connected substantially as a rigid structure without any relative radial movement. Under these conditions, the torque reaction of driving or braking between the axle and the rail tire produces a sufficient relative angular movement of the wedge rings 42 and 43 with reference to the wheel hub 21 to cause the cam surfaces 41 on the latter to ride up part way on those of said wedge rings and thereby lock the emergency rings 25 against the rail tire to avoid chatter and wear due to the blows of the rail, the torque being transmitted between the tire 16 and the rings 25 by the friction between their conical surfaces.

In the modification illustrated in Fig. 3, a wheel body member 20ª of modified form is keyed on the axle, inner and outer emergency rings or plates 25ª and 25ᵇ of modified form are mounted by their inner peripheries to slide axially on said member and drawn together by pull-springs 27, the inner plate 25ª is held against outward axial movement by a detachable retaining ring 45, the outer plate 25ᵇ is splined to the body member by anti-friction balls 46 running in grooves formed in the two, the pneumatic cushion 31 is carried by an ordinary tire rim 47 mounted on the cylindrical outer periphery or seat 48 of a middle flange 49 projecting outwardly from the hub portion of member 20ª, said flange being spoked and apertured for the reception of the springs, and the middle portions of the side walls of the cushion casing 33 are formed with rubber ribs 50 contacting with raised annular seats on the plates 25ª and 25ᵇ, so that the expansion of the middle portion of the pneumatic cushion normally holds the emergency plates apart. In this case it is mainly the flexing of the outer portions of the cushion including the tread and shoulders thereof which provides the cushioned relative radial movement of the wheel body with respect to the tire and cushioned relative lateral movements thereof, limited by contact of the conical members 19 and 39. In case of deflation of the pneumatic cushion, the tension of the springs 27 draws the plates 25ª and 25ᵇ together as in the first-described embodiment to hold the wheel body and tire in concentric, substantially rigid relation.

In the second modification shown in Fig. 4 I employ a pair of pneumatic cushions and a third pneumatic member containing the same air pressure as the cushions for holding the emergency members apart. In this case, a wheel body member 20ᵇ is keyed on the axle 10 and a pair of flanged cushions 51, 52 are screwed into its ends for retaining a pair of wheel body plates 53 against outward endwise movement, the bushing 52 being inwardly coned to receive a conical wedge plug 54 against which the retaining nut 15 abuts. A pair of pneumatic cushions 31 of ordinary tire form are carried by rims 47 fixed on inwardly-turned margins of the plates 53 and the treads of said cushions are fitted in marginal seats formed on a metal rail tire 16ª. The tire is provided with a middle, inwardly-projecting flange 55 formed with female-cone supporting surfaces 19 for engagement, in case of deflation of the cushions, by complemental male-cone surfaces 30 formed on a pair of axially-slidable emergency rings 25ᶜ which are splined at 56 to the hub portion of the body member 20ᵇ in non-turning relation therewith and forced toward each other by compression springs 27ª interposed between them and the side plates 53. The emergency rings are normally held apart by a rubber tube 57 which carries the same pressure as the cushions 31, received through pipe connections 58 including flexible sections, one of said connections having a valved inflating extension 59 whose end cap normally closes a tell-tale opening 60 in a plug 61 screwed in the outer side plate 53, the withdrawal of such end cap by inward movement of the emergency ring which carries it serving to show the deflated condition.

The control tube 57 is confined on all sides, at its inner periphery by the hub of member 20ᵇ, at its opposite sides by the rings 25ᶜ and at its outer periphery by a ring 62 slidingly fitted in grooves in the emergency rings and supported in fixed position from the side plates 53 by rods 63. A flexible contact brush 64, mounted on the tire flange 55 and contacting with the ring 62, furnishes an electrical connection between the wheel body and the tire for transmitting track-signal current. In normal operation, the relative radial movements of the wheel body and the tire are cushioned by the pneumatic cushions 31 and their relative lateral movements by the flexibility of said cushions. In case of deflation, the failure of pressure in the cushions 31 and in the control tube 57 permits the spring 27ª to force the rings 25ᶜ together, bringing the conical surfaces 19 and 30 into contact and providing a substantially rigid concentric connection between said tire and wheel body.

Various other changes could be made in the embodiment of my invention without departing from the scope thereof as defined in the claims.

I claim:

1. A cushion wheel comprising a tire, a wheel body, a pneumatic cushion interposed between the two, and emergency means automatically movable into an active position on failure of the pressure in said cushion for rigidly supporting said body concentrically on the tire in driving relation thereto, said means being automatically reset and held in an inactive position by the pneumatic pressure on restoration of said pressure.

2. A cushion wheel comprising a tire, a pneumatic cushion supported thereby, a wheel body supported by the cushion, normally inactive cone means thereon for rigidly supporting said body concentrically on the tire, and means controlled automatically by the pressure in the tire for bringing said cone means into action in case of failure of said pressure.

3. A cushion wheel structure comprising a tire having a concentric emergency supporting rigid cone member, a wheel body having a complemental concentric rigid cone member movable axially into frictional supporting and driving relation with the wheel cone member, a pneumatic cushion interposed between said tire and wheel body, and means controlled by the pressure in said cushion for automatically moving said complemental member into operative position when the cushion is deflated.

4. A cushion wheel comprising a tire, a pneumatic cushion supported thereby, and a wheel body supported by the cushion and having spring-projected means normally retracted by the pressure in said cushion for supporting said wheel body concentrically on the tire in case of failure of said pressure.

5. A cushion wheel comprising a tire, an annular pneumatic cushion supported thereon, a wheel body normally supported radially by said cushion and having a pair of emergency rings normally held apart by the pressure in the cushion for supporting the wheel body on the tire in case of deflation of the cushion, and spring means for forcing said rings together into emergency supporting position.

6. A cushion wheel comprising a tire having female-cone supporting surfaces, an annular pneumatic cushion supported on said tire, and a wheel body normally supported radially on said cushion and including a pair of spring-backed annular members provided with complemental male-cone surfaces, said members being normally held apart by the pressure in the cushion and adapted to bring their coned surfaces into contact with those of the tire for rigidly supporting the wheel body concentrically on the tire in case of failure of said pressure.

7. A cushion wheel comprising a tire, an annular pneumatic cushion element supported thereby, and a wheel body normally supported on said element and having emergency members controlled by the lateral expansion of the cushion element for concentrically supporting said wheel body on the tire in case of failure of the pressure in said element.

8. A cushion wheel according to claim 7 in which the cushion element is a flexible casing having a contained pneumatic tube and spreadable bead edges normally holding said emergency members retracted.

9. A cushion wheel according to claim 7 in which the cushion element has spreadable bead edges normally holding said emergency members retracted, and in which the shoulders of said element cushion the relative lateral movements of said wheel body and tire and said lateral movements are positively limited by the abutting of the tire and the emergency members.

10. A cushion wheel comprising a tire, a wheel body having spring projected rings providing emergency support for said wheel body on the tire, and pneumatic ring-spreading and wheel-cushioning means including an inflatable, annular member of inextensible wall construction interposed between said rings.

11. A cushion wheel comprising a rigid rail tire, a pneumatic cushion radially supported thereby and including a flexible casing having a contained pneumatic tube and spreadable inner bead edges, a wheel body including a pair of axially-movable emergency supporting rings normally held apart by said bead edges for supporting it concentrically on the tire in case of failure of pressure in the cushion, and spring means yieldingly holding said rings against said bead edges.

12. A cushion wheel comprising a tire, a wheel body including a relatively-fixed member and a pair of spring-projected, emergency rings for concentrically supporting the wheel body on the tire, said rings having opposed flanges axially slidable on said member and formed with thin, tapering margins, a pneumatic cushion engaging said tire and including a casing with beads seated on said flanges for normally holding said rings apart and an inner tube in said casing, and a flexible protective flap interposed between said body member and tube, with its margins overlapping those of said flanges.

13. A cushion wheel comprising a tire, a wheel body including a pair of axially-movable, spring-projected rings providing emergency concentric support for the wheel body on the tire, and an interposed annular pneumatic cushioning element having the middle portions of its side walls normally engaging said rings for holding them apart by expansion of the middle of said element when the latter is inflated, the flexure of the shoulders and tread of said element mainly serving to cushion the radial movements of the wheel body with respect to the tire.

14. A cushion wheel comprising an axle, a tire, a wheel body including an element fixed on the axle, spring-projected members axially slidable on said element for furnishing frictional emergency concentric support for the wheel body on the tire, and having limited angular movement with respect to said element, a pneumatic cushion interposed between said body and tire for cushioning their relative radial movement and for normally holding said members apart, and means operated by torque reaction between said element and members for angularly locking them together.

15. A cushion wheel according to claim 14 in which the torque reaction means comprises wedge rings on the axle having axial-thrust cam means, and complemental cam means on said fixed body member.

16. A cushion wheel comprising a tire having an inner annular emergency flange with female-cone supporting surfaces, a wheel body, annular interposed pneumatic cushioning elements on opposite sides of said flange, and a pair of spring-backed annular members on said body, having male-cone surfaces for coacting with the supporting surfaces of the tire flange to rigidly support the wheel body concentrically on the tire when the cushions are deflated.

17. A cushion wheel comprising a tire, a wheel body, an interposed annular pneumatic cushion, a spring-projected emergency member for supporting said tire when the cushion is deflated, and pneumatic means communicating with said cushion and having the same air pressure as the latter for normally holding said member out of emergency supporting position.

18. A cushion wheel comprising an outer tire, a wheel body, an interposed annular pneumatic cushion, a pair of emergency rings spring-projected toward each for supporting said wheel body on the tire when the cushion is deflated and adapted to limit the relative lateral movement of said body in normal operation, and a pneumatic tube interposed between said emergency rings and having its interior connected with that of the pneumatic cushion to equalize their air pressures for normally holding said rings apart, out of their emergency supporting positions.

19. A cushion wheel comprising a tire, a wheel body, an interposed pneumatic cushion, a member movable on said body to provide emergency support for the latter upon the tire when the cushion is deflated, and an extensible rubber pneumatic element confined on all sides for normally holding said emergency member out of action.

20. A cushion wheel comprising a tire having a stop flange, a wheel body, an interposed pair of pneumatic cushions flanking said flange, a pair of rings axially movable on the wheel body to provide emergency support for the latter upon the tire flange and spring-projected toward the latter, an extensible rubber pneumatic tube interposed between said rings for normally holding them apart and communicating with the pneumatic cushions, said tube being confined by the wheel body at its inner periphery, and a confining ring for the outer periphery of said tube, mounted on the wheel body and slidingly related to said rings.

ALBERT F. KINZEY.